April 27, 1954  J. A. LAUCK  2,676,548
PUMP
Original Filed March 26, 1948  2 Sheets-Sheet 1
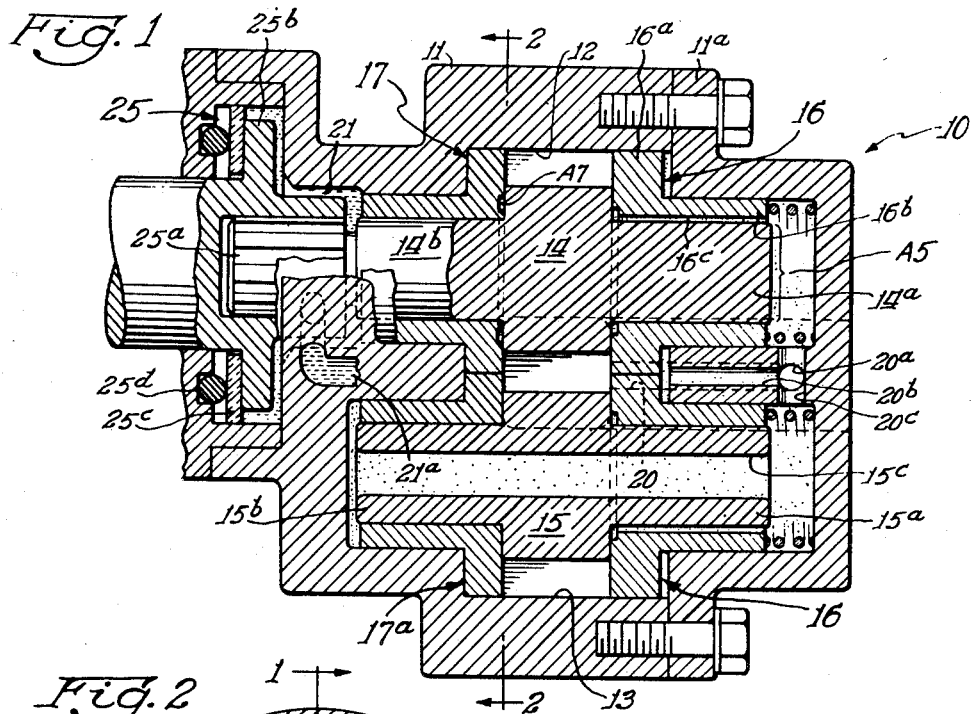
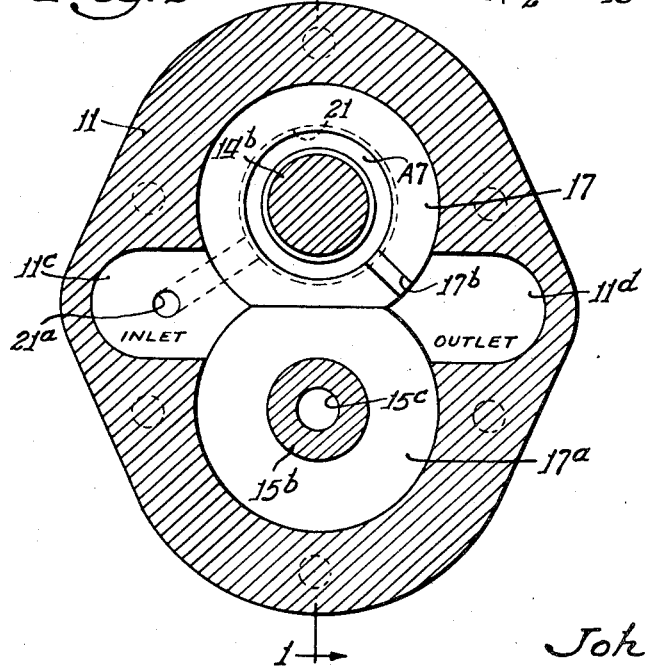
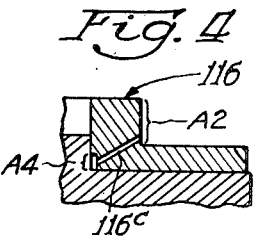
Inventor:
John A. Lauck
By: Alonzo B. Kight
Atty.

April 27, 1954  J. A. LAUCK  2,676,548
PUMP
Original Filed March 26, 1948  2 Sheets-Sheet 2
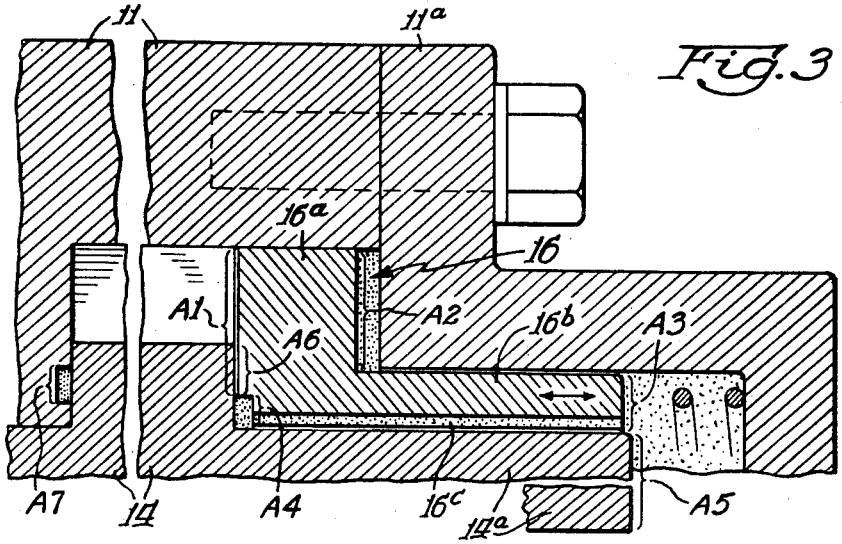
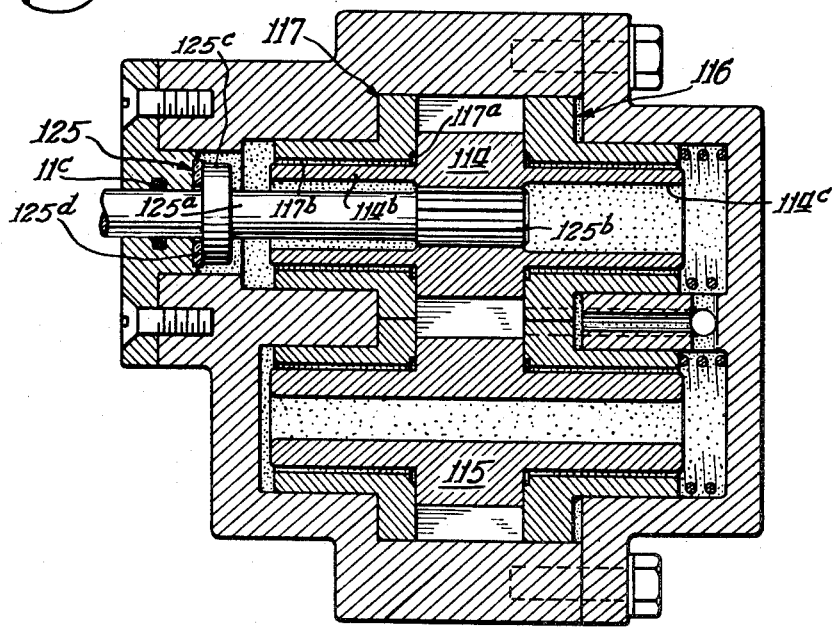
Legend:
▓▓ High Pressure
▓▓ Low Pressure
Inventor:
John A. Lauck
By Alonzo B. Kight
Atty.

Patented Apr. 27, 1954

2,676,548

UNITED STATES PATENT OFFICE 2,676,548

PUMP

John A. Lauck, Shaker Heights, Ohio, assignor to Borg-Warner Corporation, Chicago, Ill., a corporation of Illinois Continuation of application Serial No. 17,188, March 26, 1948. This application February 27, 1952, Serial No. 273,668

7 Claims. (Cl. 103—126)

This application is a continuation of application Serial No. 17,188 filed March 26, 1948, now abandoned, in the name of John A. Lauck, as inventor.

This invention relates to a high pressure gear type liquid displacement device and particularly to an improved arrangement for maintaining the axially adjustable end plates or bearing bushings in pumping seal engagement with the gear side faces.

It has heretofore been proposed to employ the liquid pressure generated by the intermeshing gears for urging the bearing bushings into pumping seal relation with the associated gear side faces, an example being the arrangement disclosed and claimed in Roth and Lauck Patent No. 2,420,622 dated May 13, 1947, the present invention being an improvement thereover.

It is an object of the present invention to provide an improved arrangement of the character contemplated in the above patent wherein the requisite over-counterbalance of the bearing bushing in the direction of pumping seal engagement is assured while at the same time the necessary lubrication is delivered to the relatively moving surfaces.

It is a further object to provide an arrangement effective to eliminate the need for venting the radial inner terminal of the sealing surface to a low pressure area and rendering it practicable to submerge the bearing bushing in the pressure liquid being pumped.

It is a still more specific object to provide in a combination of the present character for the requisite refinement of pressure counterbalancing between the gear side faces and the associated bearing bushings on both sides of the gears to thus provide the necessary lubrication and impart long life to the relatively moving surfaces.

It is another object to provide in a device of the present character an alternative arrangement effective to produce the requisite refinement of pressure counterbalancing between the gear side faces and the associated bearing bushings on both sides of the gears while effecting the requisite lubrication of all the relatively moving parts.

Other and more particular objects, advantages, and uses of my invention will become apparent from a reading of the following specification and claims taken in connection with the appended drawing forming a part thereof and wherein:

Fig. 1 is an axial cross-sectional view taken substantially on the line 1—1 of Fig. 2 and showing an intermeshing gear type pump incorporating a preferred embodiment of the present invention;

Fig. 2 is a cross-sectional view taken substantially on the line 2—2 of Fig. 1 and bringing out to advantage the arrangement of the annular passage communicating with the high pressure outlet, functioning to hydraulically counterbalance the upper gear on the left hand side thereof in Fig. 1; as well as bringing out the conduit arrangement for placing the chamber containing the flexible coupling in communication with the low pressure inlet;

Fig. 3 is an enlarged broken-away cross-sectional view of a portion of the structure shown in Fig. 1, bringing out to advantage the critical surface areas having a bearing upon the refined pressure loading and lubrication of the pump;

Fig. 4 is a broken-away axial cross-sectional view corresponding to Fig. 1, but showing an alternative arrangement for providing liquid pressure communication between surface areas A2 and A4; and Fig. 5 is an axial cross-sectional view corresponding to Fig. 1, but showing an alternative slightly modified arrangement embodying the broader aspects of the present invention.

Referring in greater detail to the figures of the drawing, a gear pump indicated generally at 10 incorporates a preferred embodiment of the invention. Pump housing 11 includes closure member 11a and is formed internally to provide a pair of parallel intersecting bores or pump chambers 12 and 13 receiving in complementary relationship intermeshing pumping gears 14 and 15. Low pressure liquid is introduced in inlet 11c and high pressure liquid is delivered from outlet 11d.

Complementary identical end plate defining means or bearing bushing and pumping seal defining means are indicated generally at 16 for cooperation with the gear side faces on one side thereof. End plates indicated generally at 17, 17a are arranged to cooperate with the opposite side faces of the gears.

It is the special construction, arrangement, and mode of operation of these bushings 16 and 17 in combination that forms the particular subject matter to which this invention is directed.

Broadly, end plate or bushing assembly 16 is arranged to be substantially completely submerged in the pressure liquid generated by gears 14 and 15 in a manner such that the pressure forces acting in the direction tending to cause the bushing to engage the adjacent gear side face in pumping seal relation always exceeds by a slight differential amount the pressure forces tending to move the bushing away from the gear side face. This arrangement differs from that disclosed in the above referred to earlier Roth and Lauck patent in that the present construction does not require an O ring seal between the housing and the bushing nor does this present arrangement require that the annular recess lying below the roots of the gear teeth be vented to a low pressure zone.

More specifically, and referring particularly to Figs. 1 through 3, the end plate or bearing end pumping seal defining means 16 comprises a first front face area A1 adapted to cooperate with the associated gear side face area, said front face and said side face constituting pairs of adjacent faces which provide a liquid pumping seal. The end plate or bushing means 16 is further provided with a second back surface area facing axially away from the gear and made up in the present instance of two surface areas designated A2 on the back of the radial flange portion 16a and surface area A3 forming the axial outer terminal of the sleeve portion 16b. For purposes of reference, surface areas A2 and A3 will be referred to jointly as the back surface area, responsive to pressure liquid generated by the gears for urging the end plate or bushing 16 axially in the direction of pumping seal engagement, as will appear.

It has been discovered that while it is desirable to submerge the bushing in the pressure liquid, when this is done the sum of the areas A2 plus A3 produces an excessive axial force in the direction of pumping seal engagement with the result of undue wear, inefficiency in the operation, and short life of the pump. This is explainable by the fact that the intensity of the liquid pressure acting on front face A1 varies from zero in the area of the teeth adjacent the inlet to a maximum intensity of pressure in the area of the teeth adjacent the outlet, whereas the intensity of the liquid pressure acting on areas A2 and A3 is substantially uniform over the entire extent of these areas. Therefore, provision is made for carefully counterbalancing a predetermined portion of the excess axial force acting on bushing 16 in the direction of the gear side face in order to assure that the bushing front face A1 is held in pumping seal engagement with the gear side face with only that amount of excess pressure necessary to prevent the pumping seal from being broken. This is accomplished in the present preferred embodimen by forming an annular recessed area A4 in the front face of the end plate or bushing and located radially inwardly of the roots of the gear teeth. Axial channel 16c is formed in the end plate or bushing and is effective, as will be seen, to place surface area A4 in communication with the pressure liquid generated by the gears. It will be seen that the pressure of the liquid acting on surface area A4 is the same as that acting on A2 and A3 and acts in a direction axially away from the associated gear and oppositely to the force of the pressure liquid acting on surface areas A2 and A3.

Therefore, it will be apparent that the liquid pressure force acting to urge bushing 16 to the left in Fig. 1 is made up of the liquid pressure forces acting uniformly on surface areas A2 and A3 throughout their circumferential extent, minus the sum of the uniform liquid pressure forces acting on surface area A4 throughout the circumferential extent thereof and the mean or average of the liquid pressure forces acting on surface area A1, the latter varying from zero adjacent the teeth at the inlet position thereof to a maximum value adjacent the discharge position of the teeth. Thus, the value of surface area A4 must be selected with the above factors taken into consideration in order to effect the requisite refinement of over-counterbalance in the direction of the gear side face.

While the proper relative sizes of the several pressure responsive areas necessary to produce the desired refinement of pressure loading may be readily ascertained by available calculating techniqes, it has been found very practicable to provide the desired precise relationship by the method commonly known as "cut and try." In practicing the latter method, a bushing 16 found upon installation to have an excess of pressure loading surface area A2, A3, is successively disassembled from the pump, placed on a lathe and increments of metal are removed or cut away to increase the size of annular surface area A4 in small steps. An increased size of annular surface area A4 is finally reached where, upon reinstallation of the bushing in the pump, it is found that the counterbalancing effect of annular surface area A4 has been made so great that the surface areas A2 and A3 are not effective to properly hold the bushing in engagement with the gear side face. Production end plates or bushings 16 are then fabricated with a slightly smaller surface area A4 so that front faces A1 are held in pumping seal engagement with the corresponding gear side faces by the action of liquid pressure on areas A2 and A3 with a force that is only slightly in excess of the oppositely acting liquid pressure forces against areas A1 and A4 tending to move the bushing away from the gear side face. Thus the pumping seal is maintained without excessive friction, wear or loss of volumetric efficiency irrespective of the pressure generated by the gears. In other words, this differential remains substantially the same and does not vary in value with increase in the pressure delivered by the pump.

As described briefly above, the gear side or front surface area A1 of the bushing 16 is acted upon by different intensities of liquid pressure at different arcuate positions about the circumference thereof. The value or intensity of the liquid pressure between the gear teeth varies from zero as the teeth pass the inlet position thereof, to a maximum intensity of liquid pressure at the discharge position of the teeth. Therefore, there is an average or resultant force acting on surface area A1 as differentiated from the uniform force of the liquid pressure acting throughout the circumferential extent of surface areas A2, A3 and A4. While the exact character of the film between the front face A1 of the bushing 16 and the area A6 of the gear side face below the roots of the teeth may not be thoroughly determined, it has been found that this film is of a lubricating character while at the same time it is effective to maintain the requisite liquid pumping seal and high volumetric efficiency. By having the gear generated pressure liquid delivered to the annular recessed area A4, the lubricating characteristics between bushing 16 and the associated gear are found to be of a superior character. This may be explainable in part by the fact that liquid pressure is always present in spline groove 16c and at the inner radial terminal of surfaces A1 and A6. From the above explanation, it will be seen that as a gear tooth approaches its inlet position, the pressure at the root of the tooth becomes zero. It will thus appear that there is a considerable pressure drop between the annular recessed area A4 and the root of the tooth at the inlet position of the tooth. This is believed to form an important aspect or part of the mode of coaction resulting in improved lubrication as well as assuring the requisite pumping seal without accompanying wear.

The liquid pressure being generated by the gears may be directed or communicated to surface areas A2 and A3 and thence to surface A4 in any desired manner. By way of example, in the preferred embodiment, this is shown schematically as being accomplished by passage 20 leading from the pump outlet to passages 20a, 20b and 20c. In practice this can be equally effectively accomplished, as disclosed in the above referred to patent, by the formation of a passage axially along the periphery of the flange portions of the bushings at their position of intersection on the discharge side of the teeth. The point of intersection of the bushings adjacent the opposite or inlet side of the teeth may be closed by a plug.

The absence of the O ring seal disclosed in the above patent leaves the liquid free to pass between the periphery of the tubular portion 16b of the bushing and the embracing housing bore thus placing surface areas A2 and A3 in liquid pressure communication. Channel 16c is preferably formed in the bushing 16 to facilitate liquid pressure communication between surface area A3 and recessed annular surface area A4.

This channel 16c serves an additional function of value in the preferred embodiment, namely, it assures that sufficient lubricant is always present between the journal and the bushing. In certain installations the manufacturing tolerance between the journal 14A and the embracing bushing may be sufficient to furnish the required liquid pressure communication between surface areas A3 and A4, without making it necessary to provide a separate passage or channel.

Recess chamber 21, arranged for the reception of a flexible coupling, is placed in communication with the low pressure inlet by means of passage 21a.

It will be understood that other arrangements may be provided for effecting the necessary liquid pressure communication between surface area A4 and the rear surface areas A2 and A3. In Fig. 4 there is shown an example of such an alternative arrangement for effecting the necessary pressure liquid communication. Bushing 116 is formed with a passage 116c serving to place surface area A2 in communication with surface area A4.

With the above construction it has been further found that the pressure liquid acting on surface area A5 of the terminal of journal 14a forces gear 14 against end plate or bushing 17 with excess pressure requiring that provision be made for counterbalancing this effect and also assuring the necessary lubrication.

The end plate or bushing assemblies 17 and 17a on the opposite side of the gears 14 and 15 from bushing 16 are generally similar to the end plates or bushings 16, with certain specific structural differences, as will appear. There is no necessity for an annular recessed surface area functioning in the same manner as annular surface area A4 since there is no liquid pressure acting on the back side and outer terminal of bushing 17. End plate or bushing 17 is, however, formed with an annular recessed surface area A7, the same being confined radially inwardly of the roots of the gear teeth and radially outwardly of the inner terminal of the gear side face. This recessed surface area A7 is placed in communication with the pressure liquid generated by the gears through radial channel 17b, formed in the inner face of the flange portion of bushing 17. This recessed surface area A7 is given a value corresponding to the area A5 on the terminal of journal 14a, thus effectively counterbalancing the action of liquid pressure on surface area A5.

It will be seen that no special provision for counterbalancing lower gear 15 is required since the surface areas at the terminal of journal 15b are identical with the areas at the terminal of journal 15a, communication between these terminals being effected through bore 15c.

Since the high pressure liquid does not have access to the left-hand terminal of bushing 17 in Fig. 1, a low pressure seal may be employed cooperating with the flexible coupling.

The seal assembly 25 may be of any available construction, such as illustrated, including splined coupling 25a, radially extending flange 25b, radial bearing washer 25c, and flexible O ring 25d.

The alternative construction shown in Fig. 5 is generally similar to that of Figs. 1 through 3 with the exception that high pressure liquid is transmitted through axial bore 114c to the left-hand terminal of journal 114b and the left-hand terminal of bushing 117, thus effecting the balancing of gear 114 in the same manner as the lower gear 115 is balanced. In addition, bushing 117 is provided with annular recess area 117a and communicating passage 117b functioning in the same manner as the corresponding elements of bushing 116, which corresponds to bushing 16 in Figs. 1 and 3. A flexible coupling assembly indicated generally at 125 includes a shaft 125a having a splined terminal 125b cooperating with complementary splines within gear 114 and providing for the passage therebetween of pressure liquid. Radial flange 125c engages a flexible seal ring 125d and is held thereagainst by the liquid pressure. O ring seal 11c may also be employed, if necessary, to prevent leakage.

While the invention has been disclosed in connection with a specific embodiment thereof, it will be understood that this is by way of example rather than limitation and that the scope of the invention is to be defined by the appended claims.

I claim:

1. In a high pressure pump comprising; a housing containing a pair of intersecting parallel substantially cylindrical chambers having generally radially extending end walls, with reduced bores therein, said housing having a high pressure discharge port and a relatively low pressure inlet port communicting with said chambers, a pair of gear members having gear teeth meshing at the juncture of said chambers, said gear members having side faces and having journals and terminal faces thereof received in said reduced bores, means defining bearing bushing and gear side face sealing means, said means including a radial flange portion received in the associated chambers and axially rearwardly extending tubular portions received in said reduced bores about said gear journals, said flanges including a front face engageable with the adjacent side face of the associated gear, said front face and said side face constituting a pair of adjacent faces which provide a pumping seal between said gear member and said bushing flange, said front face being subject to the pressure in said housing chamber between said gear teeth, said flange portion having a back face normally spaced from the adjacent radial end wall of the associated housing chamber, said tubular portion terminating in a similar back face normally spaced from the adjacent housing wall, said flange front face having a recessed annular area formed therein; passage defining means for placing the discharge pressure generated by said gears in communication with said back faces and said annular recessed area whereby to submerge substantially said bushing in said pressure liquid, said recessed annular area being so proportioned with reference to said back faces that the force acting on said bushing in the direction of pumping seal engagement always exceeds the force tending to break said seal by only a slight amount, whereby to maintain said pumping seal without excessive friction wear or loss of volumetric efficiency; end plate bushing and pumping seal defining means in said housing associated with the gear members on the opposite side of the same from said first named bearing bushing and gear side face sealing means, said bushing likewise including a radial flange portion having a front face engaging the associated gear side face in pumping seal relation, said last named front face having a recessed annular area formed therein located radially inwardly of the roots of the gear teeth and located radially outwardly of the inner periphery of said last named face, and means placing said recessed annular area in communication with the discharge pressure generated by said gears, the value of said last mentioned annular recessed area being equal to the area of the terminal face of said gear journal.

2. A pump comprising a housing containing a pair of intersecting, parallel, substantially cylindrical chambers having generally radially extending end walls with reduced bores formed therein, said housing having a discharge port and an inlet port communicating with said chambers, a pair of gear members having gear teeth meshing at the juncture of said chambers, said gear members having side faces and having journals and terminal faces thereof received in said reduced bores, means defining bearing bushing and gear side face sealing means located on one side of said gear members, said means including a radial flange portion received in the associated chambers and axially rearwardly extending tubular portions received in said reduced bores about said gear journals, each of said flanges including a front face engageable with the adjacent side face of the associated gear, said front face and said side face constituting a pair of adjacent faces which provide a pumping seal between said gear member and said bushing flange, said front face being subject to the pressure in said housing chamber between said gear teeth, said flange portion having a back face normally spaced from the adjacent radial end wall of the associated housing chamber, said tubular portion terminating in a similar back face normally spaced from the adjacent housing wall, said flange front face having a recessed annular area formed therein; passage defining means for placing the discharge pressure generated by said gears in communication with said back faces and said annular recessed area whereby to submerge substantially said bushing in said pressure liquid, said recessed annular area being so proportioned with reference to said back faces that the force acting on said bushing in the direction of pumping seal engagement always exceeds the force tending to break said seal by only a slight amount, whereby to maintain said pumping seal without excessive friction wear or loss of volumetric efficiency; a second end plate bushing and pumping seal defining means in said housing associated with the gear members and located on the opposite side of the same from said first named bearing bushing and gear side face sealing means, said second bushing means likewise including a radial flange portion having a front face engaging the associated gear side face in pumping seal relation and having a recessed annular area formed therein located radially inwardly of the roots of the gear teeth and located radially outwardly of the inner periphery of said last named face, and means placing said recessed annular area in communication with the discharge pressure generated by said gears, the value of said last mentioned annular recessed area being equal to the area of the terminal face of said gear journal.

3. In a fluid pump of the type comprising a housing having a pump chamber formed therein and an inlet leading to and an outlet leading from said pump chamber, pumping means including a toothed pumping gear in said chamber effective to force fluid from said inlet out of said housing through said outlet, a supporting shaft connected to said gear and having a terminal portion with an end face area thereon extending axially from at least one side thereof, means defining a bearing surface on the opposite side of said gear from said terminal portion, said surface having a recessed annular area formed therein and located radially inwardly of the roots of the gear teeth of the pumping gear, means placing said recessed annular area in communication with the discharge pressure generated by said pump, and means placing the end face area of said terminal portion of said pumping gear supporting shaft in communication with the discharge pressure generated by said pump, the value of said two areas being substantially equal.

4. In a pressure loaded gear type liquid pump having a pair of toothed intermeshing gears with side faces, means defining an axially adjustable end plate, said end plate having a first front face area engageable with the adjacent gear side face in pumping seal relation thereto, said end plate further including means defining a second front face area disposed adjacent the gear side face and disposed wholly radially inwardly of the roots of the gear teeth, said end plate further including means defining a third and a fourth facing surface area normally spaced from the adjacent housing wall and axially displaced from said second area and from each other and responsive to discharge pressure liquid generated by said gears for urging said end plate in the direction of pumping seal engagement with said gear side face, means defining a passage whereby the pressure on the second area is maintained at the value of the pressure acting on the third and fourth areas, and passage defining means effective to direct the liquid pressure generated by said gears to said second, third and fourth areas whereby to substantially submerge said bushing in liquid at the discharge pressure value generated by said gears.

5. A high pressure liquid pump comprising a housing having a pump chamber therein and an inlet leading to and an outlet leading from said pump chamber; means including a rotatable toothed pumping gear received in said pump chamber for forcing liquid from said inlet out of said housing through said outlet; an axially adjustable end plate in said pump chamber having surface areas facing away from said rotatable gear and normally spaced from the adjacent end wall of said pump chamber, said end plate also having a front face subject to the pressure gradient in said pump chamber and engageable with the adjacent side face of said rotatable gear to provide a pumping seal therewith, one of said two last-mentioned faces having an annular recessed area formed therein wholly inwardly of the teeth of said pumping gear, conduit defining means including said end plate for communicating the discharge pressure from said rotatable gear to said surface areas facing away from said side face and to said annular recessed area, the relation of said sealing area, said annular recessed area and said end plate surface areas facing away from said side face being such that the liquid pressure force acting on said end plate in the direction of pumping seal engagement always exceeds the force tending to break said seal only slightly, whereby to maintain said pumping seal without excessive friction, wear or less in volumetric efficiency.

6. A high pressure liquid pump comprising; a housing containing a pair of adjoining substantially cylindrical chambers having generally radial end walls, said housing having a high pressure discharge port and a relatively low pressure inlet port communicating with said chambers, gear members having side faces and having gear teeth meshing at the juncture of said chamber; end plate bearing and pumping seal defining means in said housing associated with said gear members on at least one side of said gear members, said end plate bearing and pumping seal means including front faces engageable with the adjacent side faces of the associated gear members, said front faces and said side faces constituting pairs of adjacent faces which provide a pumping seal between said gear members and said end plate means, said front faces being subject to the pressures in said housing chambers between said gear teeth, said end plate means also having back faces normally spaced from the adjacent radial end walls of the associated housing chambers and having portions engageable with said housing to provide liquid pressure space at the back of said end plate means for acting on said back faces to urge said front faces into engagement with said gear side faces; means establishing communication between said high pressure port and said pressure space at the back of said end plate means, an annular recess formed in one face of each pair of said pairs of adjacent pumping seal providing faces, said annular recesses being disposed inwardly of the roots of the teeth of said gear members and providing a pressure responsive surface acting axially outwardly from said gear side face, and means establishing communication between said back face, said annular recesses and the liquid pressure generated by said gears; the back face area and the annular recess area of one end plate being so proportioned that the force acting on said end plate in the direction of pumping seal engagement always exceeds the force tending to break said seal by only a slight amount, whereby to maintain said pumping seal without excess friction, wear, or loss in volumetric efficiency.

7. A high pressure pump as claimed in claim 6 including an area on at least one of said gears subject to discharge pressure which tends to urge said gear out of engagement with its end plate, means including an oppositely disposed annular recess subject to discharge pressure and located radially inwardly of the roots of the gear teeth on the opposite gear side face from the aforementioned annular recess to oppose the action of said gear area, the value of said gear area and said oppositely disposed annular recess being substantially equal, and means for communicating discharge pressure to said gear area and said oppositely disposed recess.

References Cited in the file of this patent

UNITED STATES PATENTS

| Number | Name | Date |
|---|---|---|
| 1,441,375 | Rolaff | Jan. 9, 1923 |
| 1,470,030 | Rolaff | Oct. 9, 1923 |
| 1,590,384 | Kucher | June 29, 1926 |
| 1,635,522 | Wilson | July 12, 1927 |
| 2,312,891 | Ferris | Mar. 2, 1943 |
| 2,321,609 | Marco | June 15, 1943 |
| 2,336,294 | Rea | Dec. 7, 1943 |
| 2,420,622 | Roth | May 13, 1947 |

FOREIGN PATENTS

| Number | Country | Date |
|---|---|---|
| 19,080 | Great Britain | of 1912 |
| 24,512 | Great Britain | of 1908 |